C. L. LIBBY.
FEED FOR LATHES.
APPLICATION FILED FEB. 6, 1908.
939,043.
Patented Nov. 2, 1909.
3 SHEETS—SHEET 1.
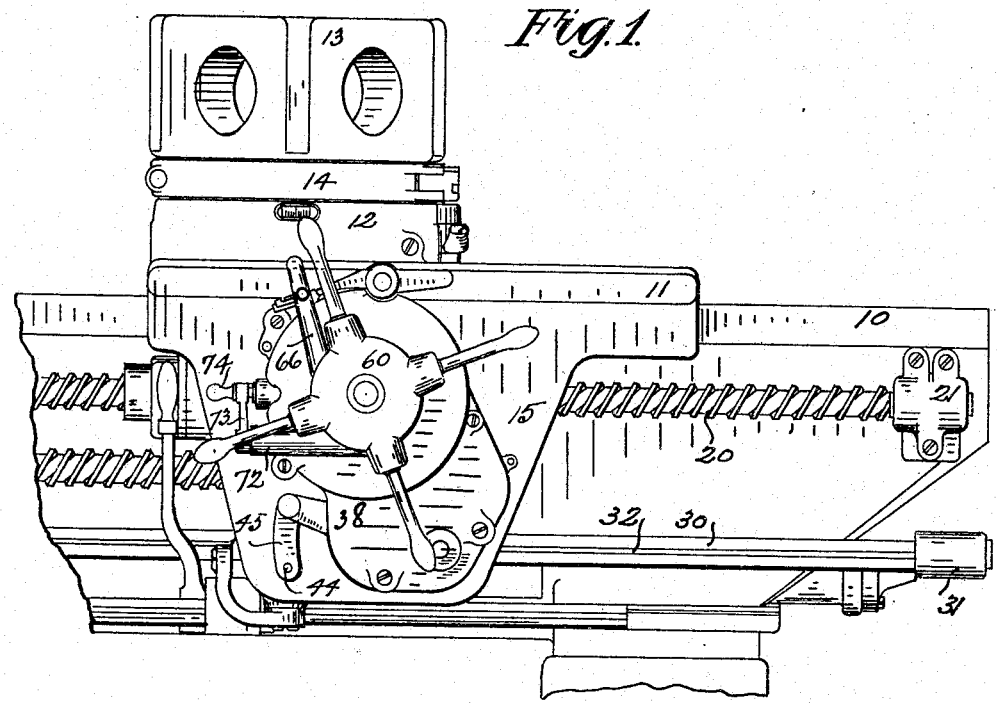
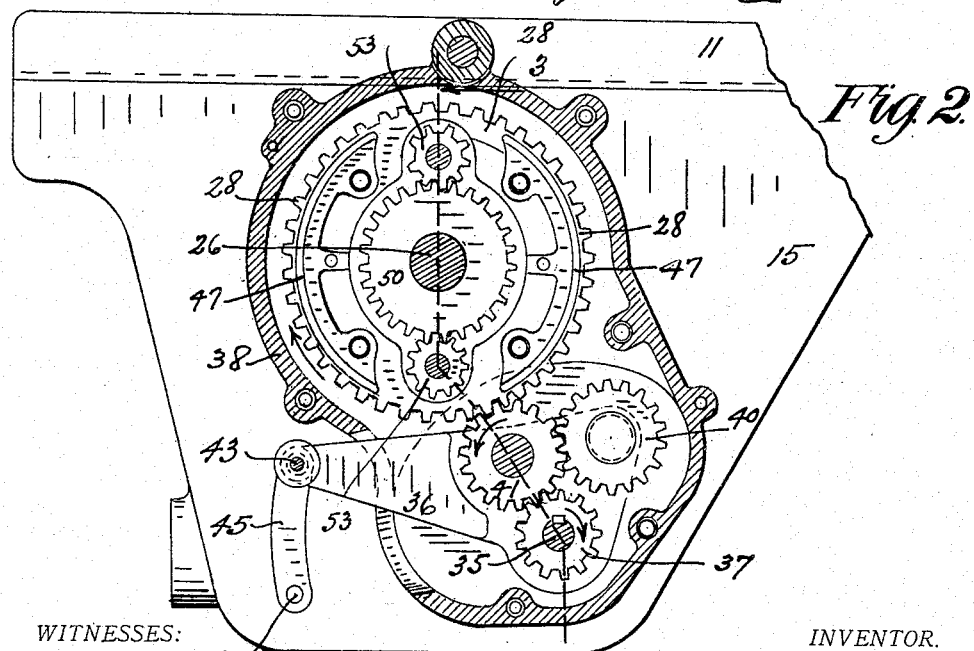
WITNESSES:
W. M. Gentte
Olive Breeden
INVENTOR.
Charles L. Libby
BY
T. H. Lockwood
ATTORNEY.

C. L. LIBBY.
FEED FOR LATHES.
APPLICATION FILED FEB. 6, 1908.

939,043.

Patented Nov. 2, 1909.
3 SHEETS—SHEET 2.

WITNESSES:
W. M. Gentle,
Olive Breeden

INVENTOR.
Charles L. Libby
BY
V. H. Lockwood.
ATTORNEY.

C. L. LIBBY.
FEED FOR LATHES.
APPLICATION FILED FEB. 6, 1908.

939,043.

Patented Nov. 2, 1909.
3 SHEETS—SHEET 3.

WITNESSES:
W. M. Gentle.
Olive Breeden

INVENTOR.
Charles L. Libby,
BY
V. H. Lockwood
ATTORNEY.

UNITED STATES PATENT OFFICE.

CHARLES L. LIBBY, OF INDIANAPOLIS, INDIANA.

FEED FOR LATHES.

939,043.  Specification of Letters Patent.  Patented Nov. 2, 1909.

Application filed February 6, 1908. Serial No. 414,503.

*To all whom it may concern:*

Be it known that I, CHARLES L. LIBBY, of Indianapolis, county of Marion, and State of Indiana, have invented a certain new and useful Feed for Lathes; and I do hereby declare that the following is a full, clear, and exact description thereof, reference being had to the accompanying drawings, in which like figures refer to like parts.
The object of this invention is to provide an improved feed mechanism for lathes.

One feature of the invention consists in providing a system of planetary gears for transmitting power from a continuously operative driving shaft to means operative on a stationary lead screw that enables the feed to be quickly stopped and the impetus of the carriage quietly checked, and also be quickly and quietly reversed. To this end there is provided a large constantly driven gear within which there is mounted a gear for driving the feed mechanism on the lead screw and another gear which may be stopped or released by the stop mechanism, and planetary gears for transmitting power from the continuously rotating large gear to said stop gear, and from the latter to the gear that operates the feed mechanism on the lead screw, whereby when the stop gear is stopped, the feed mechanism will be operated, and when the stop gear is revolving, like an idler, the feed mechanism will not be operated. By reason of this construction, when the feed is released the pilot wheel rotates and by the operator holding on to the pilot wheel causes the feed to act without being mechanically connected. Also in taking heavy shaving cuts the operator can release the pilot wheel, that is, let it slip through his fingers, and reduce his feed to any fineness that he wishes.

The full nature of this invention will be understood from the accompanying drawings and the following description and claims.

Figure 3:
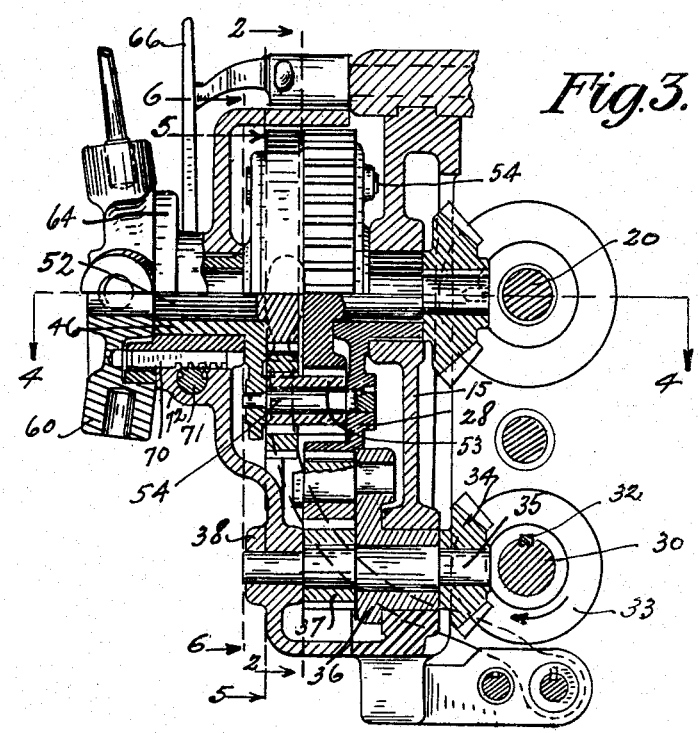
Figure 4:
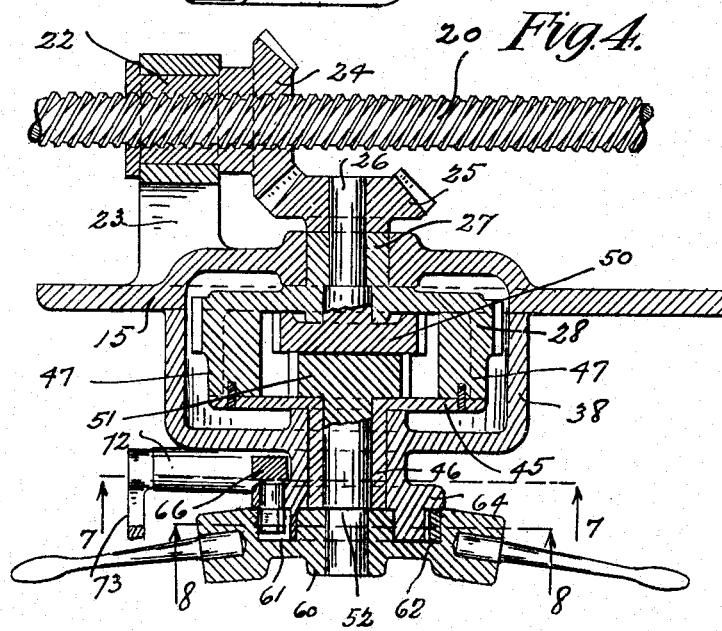
Figure 5:
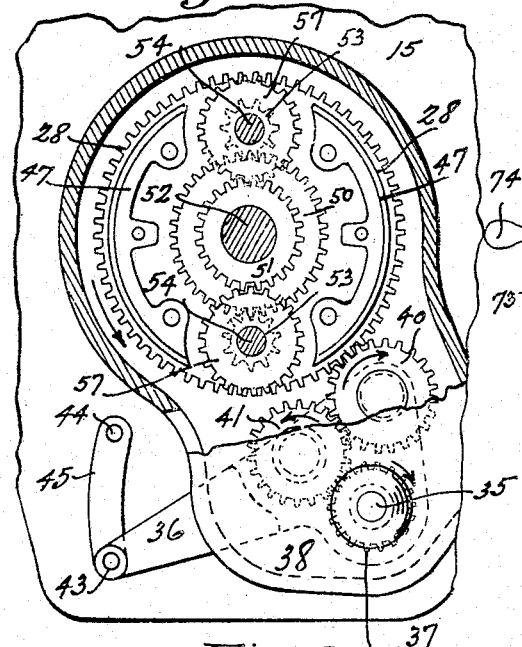
Figure 7:
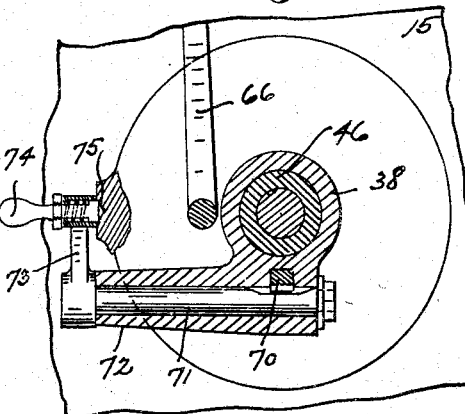
Figure 6:
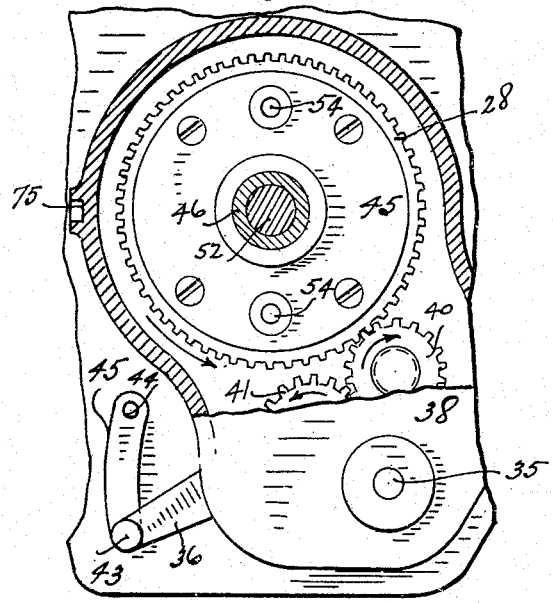
Figure 8:
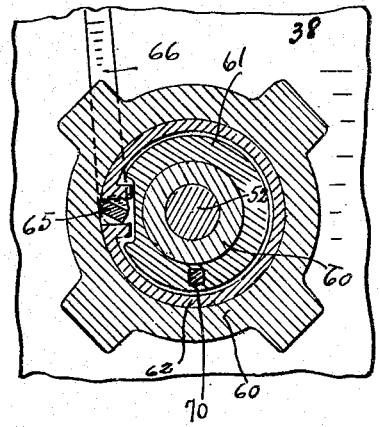

In the drawings Figure 1 is a front elevation of a part of a turret lathe, parts being broken away. Fig. 2 is a vertical longitudinal section of the planetary gear mechanism on the line 2—2 of Fig. 3. Fig. 3 is a substantially vertical section transversely of the feed mechanism on the line 3—3 of Fig. 2, some parts in the upper portion of said figure being in elevation. Fig. 4 is a horizontal section on the line 4—4 of Fig. 3. Fig. 5 is a section on the line 5—5 of Fig. 3. Fig. 6 is a section on the line 6—6 of Fig. 3. Fig. 7 is a horizontal section on the line 7—7 of Fig. 4. Fig. 8 is a horizontal section on the line 8—8 of Fig. 4.

There appears in the drawings a lathe bed 10 upon which the turret slide 11 is mounted, said turret slide having an extension 12 at one end upon which the turret 13 is secured by the clamp ring 14. From one side of the turret slide an apron 15 depends.

The turret is fed or moved by the rotation of means carried by the apron that meshes with the threads on the lead screw rod 30 mounted horizontally to the side of the lathe in suitable bearings, such as 21. Upon said screw 20 a threaded sleeve 22 is mounted as shown in Fig. 4, said sleeve being revolubly mounted in the bearing 23 and carrying on one end thereof a bevel gear 24. Said threaded sleeve and bevel gear are rotated on the screw by bevel gear 25 and the shaft 26, which is rotatably mounted in the hub 27 of the gear 28, and said hub is mounted in the apron 15 and the bearing 23 extends inwardly from the apron 15.

The parts above described are driven from the feed shaft 30 mounted horizontally at the side of the machine in suitable bearings, such as 31. Said shaft has a spline 32 extending for the full length thereof and a bevel gear 33 is splined thereon as shown in Fig. 3, and it meshes with the bevel gear 34 that is keyed to the shaft 35. Said shaft is mounted in the tumbler lever 36 and the tumbler lever is mounted in the apron 15. There is a pinion 37 on the shaft 35 between the tumbler lever 36 and the cover 38.

As seen in Fig. 2, there are two pinions 40 and 41 mounted by suitable spindles on the tumbler lever, the pinion 41 being always in mesh with the pinion 37 and at times in mesh with the large gear 28. Said pinion 41 is always in mesh with the pinion 40 and the latter is in mesh at times with the gear 28, as in Fig. 5, when the outer end of the tumbler lever is thrown downwardly from the position shown in Fig. 2, to the position shown in Fig. 5 so that the pin 43 will engage the hole 44 at the lower end of the plate 45, and when the lever is in this position, power is transmitted from the gear 37 to the gear 28 through both the gears 40 and 41, but when the tumbler lever is in the position shown in Fig. 2, power is transmitted directly from the pinion 37 through pinion 41 to gear 28. The purpose of this is to reverse the direction of movement of the gear 24.

The gear 28 is mounted as shown in Fig. 4 and is quite wide and hollow, having a front plate 45 that has a hub 46 having bearing in the cover 38. The gear 28 has on two opposite sides, as shown in Fig. 2, segmental frame plates 47, the width of which is shown in Fig. 4, and as there shown said plates 47 may be integral with the body of the gear 28, and upon said frame plates 47 the front plate 45 is secured. This makes the gear 28 as a whole hollow, the upper and lower portions however being open, as shown in Fig. 2. Centrally located within the chamber thus formed there is a gear 50 on the outer end of the shaft 26. There is an independent gear 51 coaxial with the gear 50 and secured on the inner end of the shaft 52 that is mounted in the sleeve 46, see Figs. 4 and 5. The gear 50 meshes with the two oppositely located gears 53 mounted on spindles 54 which are secured at their ends in the gear 28 at the rear and the plate 45 in front, said gears 53 appearing in Fig. 2. The gear 51 meshes with the gears 57 that are likewise mounted upon the spindles 54 and are secured to or are integral with the smaller gears 53, see Figs. 3 and 5.

On the outer end of the shaft 52 a pilot wheel 60 is secured. It is provided with an annular recess in which a friction ring 62 is located in front of the flanged extension 64 in the cover 38, see Fig. 4. Said ring 62 is split as shown in Fig. 8 and is spread by the flat end 65 which is oscillated by the stop lever 66. The ring 62 cannot rotate independently of the flange 63 or extension 64 from the cover because of the spreading bar 65 from the lever 66 which is mounted stationary in the extension 64 from the cover, as shown in Fig. 4. Therefore, when said ring is expanded, as shown in Fig. 8 by actuating the lever 66, it frictionally engages the pilot wheel and stops the rotation of said wheel as well as shaft 52 and gear 51 on the inner end thereof. When that occurs and the gear 51 is maintained stationary, the planetary gears will cause the revolution of the gear 50 and, therefore, the actuation of the gear 24 on the screw 20, and thereby cause a feeding movement. On the other hand, when the stop lever 66 is actuated in the opposite direction from what is shown in Fig. 8 and the spring 62 is relaxed, the pilot wheel can then turn and likewise the gear 51 on the inner end of the shaft 52. When said gear 51 is free to move, no power will be transmitted from the large gear 28 to the gear 50 and the feeding movement will cease.

Alternative means, of a more positive character, is provided for engaging the pilot wheel and, therefore, holding the gear 51 stationary during the feeding movement of the device. This is used when the tool is employed for cutting screw threads. It consists of a transversely slidable rack bar 70 mounted in the lower portion of the extension from the cover 38, as seen in Figs. 3 and 7, and in position to be moved into and out of engagement with the pilot wheel by the rod 71 which has on it longitudinally extending teeth to engage said rack bar, said rod being mounted in the lateral extension 72. The rod 71 is operated by the crank 73 having a spring-pressed handle 74 adapted to engage a notch 75 in the cover 38 for holding the rack bar 70 in its actuated position. This mechanism is in the nature of a timing device. For instance, if the gearing and mechanism have been so arranged that with one revolution of the pilot wheel the mechanism will be fed one inch or any definite distance or number of threads on the screw being cut, whenever the machine is run back by hand either one or any number of revolutions of the pilot wheel, the pilot wheel is stopped by the rack bar 70. In other words, that rack bar when held in an engaging position, will stop the pilot wheel at the end of one revolution or at the end of any number of revolutions, and when thus stopped the tool is in exactly the right place to enter a thread properly and without the necessity of further adjustment or operation.

What I claim as my invention and desire to secure by Letters Patent is:

1. A carriage feed for lathes including a continuously revolving large driving gear, means for reversing it, a driven pinion centrally mounted in said driving gear, means actuated by said pinion for moving the carriage, a driving pinion also centrally mounted in said driving gear in juxtaposition with said driven pinion and differing in diameter therefrom, means for controlling the rotation of one of these pinions, and a pair of planetary gears carried by said driving gear and secured together and meshing respectively with said pinions, substantially as and for the purpose set forth.

2. A carriage feed for lathes including a continuously revolving large driving gear, means for reversing it, a driven pinion centrally mounted in said driving gear, means actuated by said pinion for moving the carriage, a driving pinion also centrally mounted in said driving gear in juxtaposition with said driven pinion and differing in diameter therefrom, means for controlling the rotation of one of these pinions, a pair of planetary gears carried by said driving gear and secured together and meshing respectively with said pinion, a pilot wheel mounted in connection with the driving pinion so as to rotate therewith, and means for frictionally stopping said pilot wheel.

In witness whereof, I have hereunto affixed my signature in the presence of the witnesses herein named.

CHARLES L. LIBBY.

Witnesses:
OLIVE BREEDEN,
V. H. LOCKWOOD.